United States Patent
Jang et al.

(10) Patent No.: US 7,907,560 B2
(45) Date of Patent: Mar. 15, 2011

(54) METHOD, SYSTEM AND PROGRAM PRODUCT FOR INDICATING CONCURRENT SERVICE CAPABILITY WITH ENHANCED PRECISION

(75) Inventors: Ke-Chi Jang, Plano, TX (US); Chung-Ching Wang, Plano, TX (US)

(73) Assignee: Nortel Networks Limited, Mississauga, Ontario (CA)

( * ) Notice: Subject to any disclaimer, the term of this patent is extended or adjusted under 35 U.S.C. 154(b) by 1616 days.

(21) Appl. No.: 10/880,226

(22) Filed: Jun. 29, 2004

(65) Prior Publication Data

US 2005/0036446 A1    Feb. 17, 2005

Related U.S. Application Data

(60) Provisional application No. 60/494,863, filed on Aug. 13, 2003.

(51) Int. Cl.
*H04Q 7/00* (2006.01)
*H04L 12/28* (2006.01)
*H04J 1/02* (2006.01)
*H04J 1/14* (2006.01)

(52) U.S. Cl. ........ 370/328; 370/335; 370/389; 370/441; 370/493; 370/495

(58) Field of Classification Search ............... 370/229, 370/230, 235, 236, 236.1, 236.2; 455/436, 455/439
See application file for complete search history.

(56) References Cited

U.S. PATENT DOCUMENTS

| | | | |
|---|---|---|---|
| 6,845,236 B2* | 1/2005 | Chang | 455/414.1 |
| 7,130,285 B2* | 10/2006 | Chang | 370/331 |
| 2002/0037710 A1* | 3/2002 | Park | 455/414 |
| 2002/0071480 A1* | 6/2002 | Marjelund et al. | 375/141 |
| 2003/0083081 A1* | 5/2003 | Sanders et al. | 455/466 |
| 2004/0203674 A1* | 10/2004 | Shi et al. | 455/415 |
| 2005/0007974 A1* | 1/2005 | Vasudevan et al. | 370/320 |

FOREIGN PATENT DOCUMENTS

| WO | WO 00/16576 | 3/2000 |
|---|---|---|
| WO | WO 02/093968 | 11/2002 |

OTHER PUBLICATIONS

Chinese Patent Office, Chines Office Action for Chinese Application No. 200480029685.7, 19 pgs., Apr. 4, 2008.

\* cited by examiner

*Primary Examiner* — Seema S Rao
*Assistant Examiner* — Christine Duong
(74) *Attorney, Agent, or Firm* — Trop Pruner & Hu, P.C.

(57) ABSTRACT

A communication network includes first and second network entities capable of over-the-air communication. The second network entity receives at least one message communicated over-the-air by the first network entity. The message includes one or more message fields indicating a number of concurrent over-the-air service instances with the second network entity supported by the first network entity. The second network entity limits a number of concurrent over-the-air service instances requested by the second network entity in accordance with the one or more message fields in the message.

21 Claims, 6 Drawing Sheets

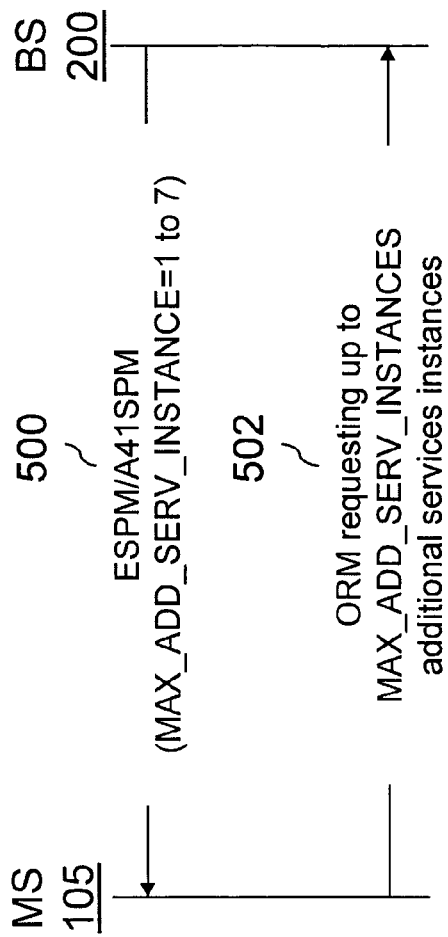
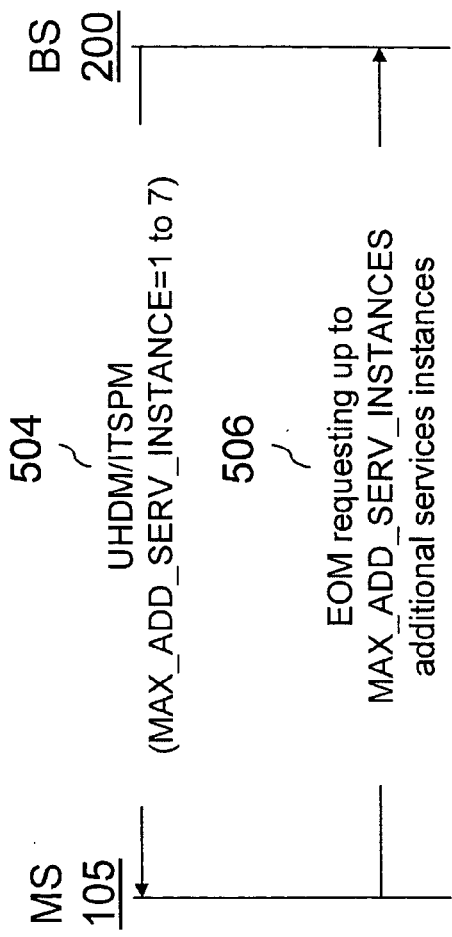

METHOD, SYSTEM AND PROGRAM PRODUCT FOR INDICATING CONCURRENT SERVICE CAPABILITY WITH ENHANCED PRECISION

PRIORITY CLAIM

The present application claims priority under 35 U.S.C. 119(e) to U.S. Patent Application Ser. No. 60/494,863, filed Aug. 13, 2003, which is incorporated herein by reference in its entirety.

BACKGROUND OF THE INVENTION

1. Technical Field

The present invention relates in general to communication and, in particular, to methods, systems and program products for communication via a wireless communication network. Still more particularly, the present invention is related to methods, systems and program products for indicating the supported concurrent service capability in communication between a mobile station and a base station in a wireless communication network.

2. Description of the Related Art

With the adoption of new digital technologies, over-the-air radio frequency (RF) communication provides an ever increasing number of voice and data services to users of mobile stations, such as digital pagers and mobile telephones. In order to permit interoperability of mobile stations between networks, standards organizations have promulgated a number of specifications to define required features and behaviors of access networks, core networks and network devices providing over-the-air RF communication. For example, the $3^{rd}$ Generation Partnership Project 2 (3GPP2) defines a number of specifications for communications employing the $3^{rd}$ generation (3G) Code Division Multiple Access (cdma2000) protocols, which support wireless voice and data services.

Among the many specifications promulgated by 3GPP2, is C.S0005-D v1.0 (TIA-2000.5-D), entitled "Upper Layer (Layer 3) Signaling Standard for cdma2000 Spread Spectrum Systems Release D," which is dated February 2004, is incorporated by reference herein in its entirety, and hereinafter referred to as the "Standard." As indicated by its title, the Standard specifies the signaling protocols and messaging format of network layer (Layer 3) communication in a cdma2000-compliant communication network.

Of note in the Standard is the support for concurrent data and voice communication over-the-air between a base station and a mobile station in a cdma2000-compliant communication network. This so-called "concurrent service capability," which has been included within cdma2000 standards since the adoption of TIA IS-2000-A in July 2001, is supported through the inclusion within mobile station and base station data stores (and in messaging between a mobile station and base station) of a CS_SUPPORTED field that indicates base station and mobile station concurrent service capability. For example, the 1-bit CS_SUPPORTED field can be included in the mobile station's Capability Information record to indicate the mobile station's concurrent service capability. This same CS_SUPPORTED field can also be included in an Extended Systems Parameter Message (ESPM), ANSI-41 System Parameters Message (AS41SPM), Universal Handoff Direction Message (UHDM), General Handoff Direction Message (GHDM) or In-Traffic System Parameters Message (ITSPM) to indicate a base station's concurrent service capability. If the CS_SUPPORTED field is set to '1', concurrent service is supported by the network entity, and if the CS_SUPPORTED field is set to '0', concurrent service is not supported by the network entity.

The present invention recognizes, however, that the CS_SUPPORTED field imprecisely indicates support for concurrent services, raising several ambiguities about the capabilities of the network entity (i.e., base station or mobile station) providing the CS_SUPPORTED field. For example, a CS_SUPPORTED field set to "1" does not indicate:

1. Whether or not the network entity supports concurrent voice and packet data services or multiple concurrent data services only;
2. The number of concurrent services the network entity can support; or
3. The number of simultaneous packet data services the network entity can support.

These ambiguities are significant because supporting concurrent voice and data communication is more complicated, and hence more expensive, than supporting multiple concurrent packet data services. Consequently, to reduce cost, some base stations or mobile stations may choose to support only concurrent packet data services, but not concurrent voice and packet data services. As a result, if a base station does not support concurrent voice and data and has the CS_SUPPORTED field set to '1' to indicate the support of concurrent services, a mobile station, without knowing the true capability of the base station, may request a voice call connection in addition to its active data session. This request will fail because the base station does not support this capability, resulting in unnecessary utilization of airlink resources.

The present invention recognizes that it would be useful and desirable to reduce or eliminate such needless utilization of airlink resources by promoting more precise communication of concurrent services capabilities.

SUMMARY OF THE INVENTION

In view of the foregoing and other shortcomings in the art, the present invention provides improved methods, systems and program products for communicating and/or controlling communication in accordance with indications of concurrent service capability having enhanced precision.

In accordance with at least one embodiment of the present invention, a communication network includes first and second network entities capable of over-the-air communication. The second network entity receives at least one message communicated over-the-air by the first network entity. The message includes one or more message fields indicating a number of concurrent over-the-air service instances with the second network entity supported by the first network entity. The second network entity limits a number of concurrent over-the-air service instances requested by the second network entity in accordance with the one or more message fields in the message.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 6A is a first exemplary message flow in which concurrent services capability is communicated between a base station and mobile station in accordance with a third embodiment of the present invention; and FIG. 6B is a second exemplary message flow in which concurrent services capability is communicated between a base station and mobile station in accordance with a third embodiment of the present invention.

DETAILED DESCRIPTION OF ILLUSTRATIVE EMBODIMENT

Figure 1:
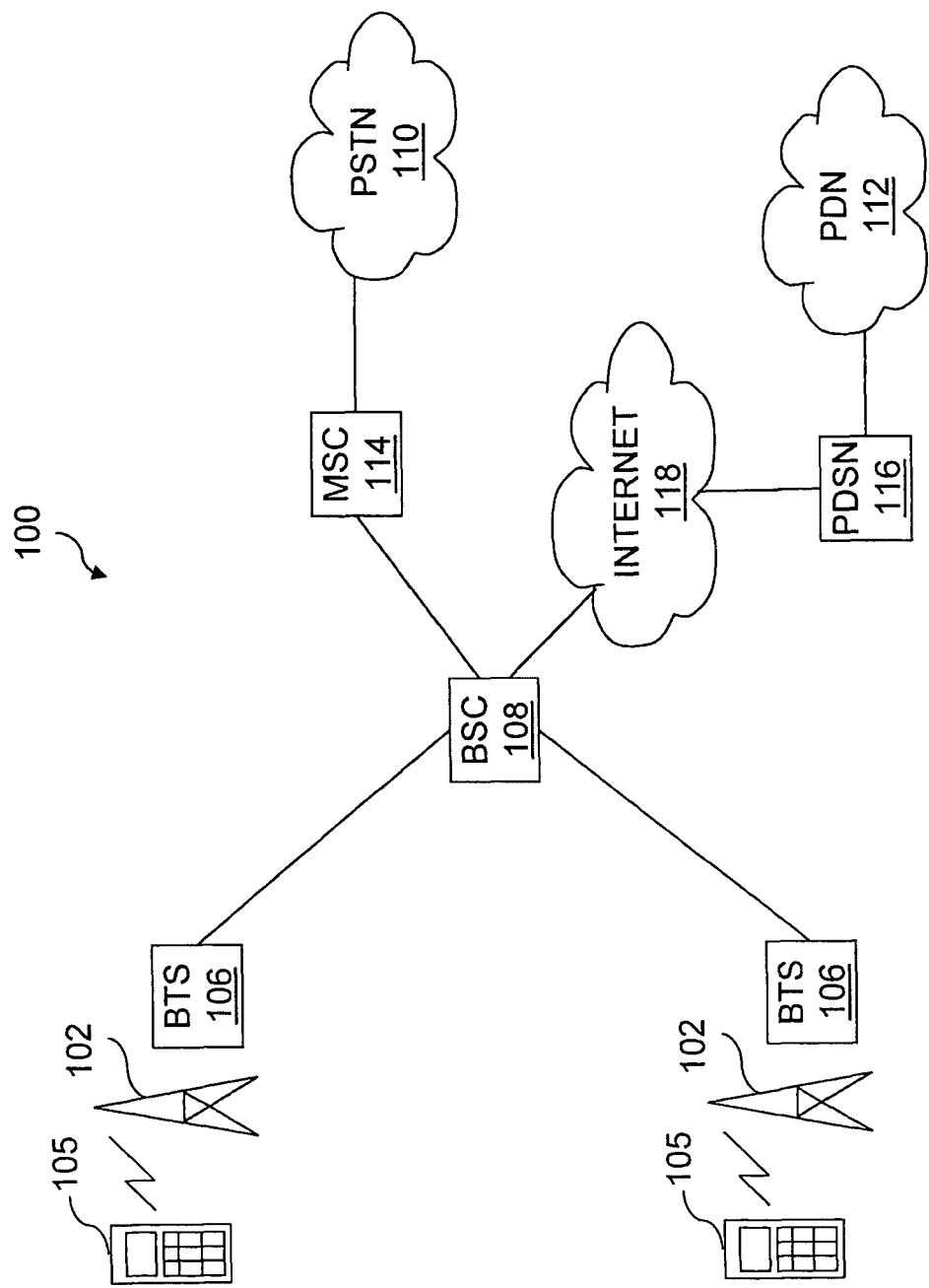
FIG. 1 is a high level block diagram of an exemplary communication network in which the present invention may advantageously be employed.

With reference to the figures and in particular with reference to FIG. 1, there is illustrated a high level block diagram of an exemplary communication network 100 in which the present invention may advantageously be implemented. As shown, communication network 100 comprises a number of geographically distributed transmission antennas 102, which transmit and receive radio frequency (RF) signals 104 to and from network entities including mobile stations (MSs) 105. RF signals 104, which may employ any of a number of signaling protocols, such as Code Division Multiple Access (CDMA) or Global System for Mobiles (GSM), are generated by base transceiver stations (BTSs) 106, which are each affiliated with a respective one of the transmission antennas 102. BTSs 106 are in turn coupled to and controlled by base station controller (BSC) 108. Coupled to BSC 108 are various network and communication terminals that originate and receive the communications transmitted over-the-air as RF signals.

For example, in the depicted embodiment, network terminals from which communications originate include circuit voice and data network (e.g., a public switched telephone network (PSTN)) 110 and packet data network (PDN) 112. In the illustrated embodiment, PSTN 110 is connected to BSC 108 via a land line and a mobile switching center (MSC) 114. PDN 112 is connected to BSC 108 via a Packet Data Serving Node (PDSN) 116 and the Internet 118. It is understood that both PSTN 110 and PDN 112 may comprise wireless devices (e.g., mobile telephones).

Within communication network 100, a network entity, such as a mobile station or BSC, may be the source and/or recipient of both data and voice communications. Additionally, like network entities may function as both sources and recipients of voice and data network communications.

Figure 2:
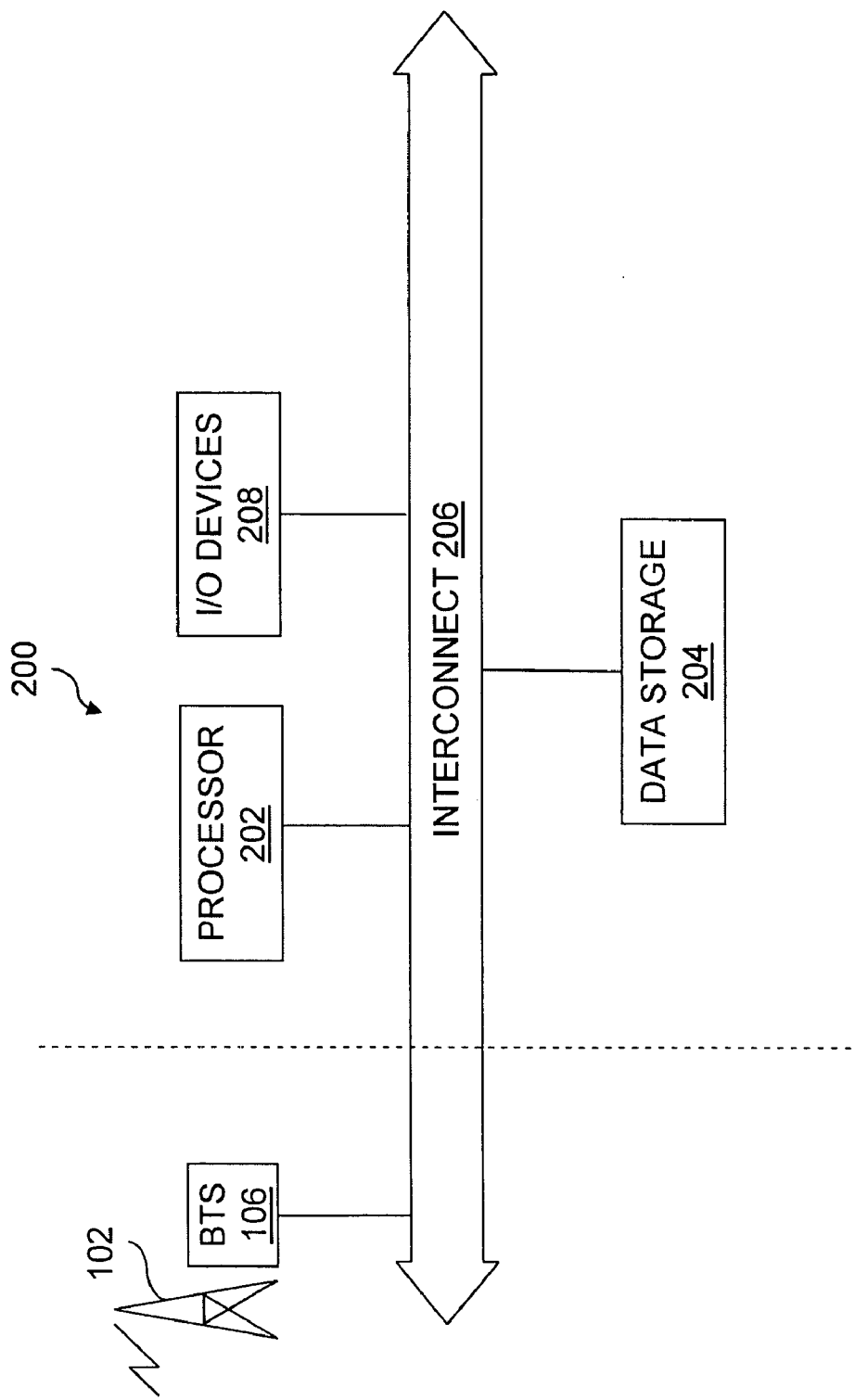
FIG. 2 is more detailed block diagram of a base station within the communication network of FIG. 1 in accordance with the present invention.

Referring now to FIG. 2, there is depicted a more detailed block diagram of an exemplary base station (BS) 200 within communication network 100 in accordance with the present invention. As shown, BS 200 comprises a data processing system or processor (e.g., computer, router, switch and/or switching center) to communicate voice and/or data over-the-air with one or more mobile stations 105. BS 200 includes a processor 202 that controls (i.e., executes) operations in accordance with the present invention. Processor 200 may perform such operations under the control of software or firmware residing within data storage 204 (e.g., volatile and/or non-volatile storage) coupled to processor 202 by an interconnect 206 or received by processor 200 from a network interface unit or other Input/Output (I/O) device 208.

BS 200 further includes a base transceiver station (BTS) 106, coupled to processor 200 by interconnect 206, which operates as the carrier frequency controller. That is, BTS 106 allocates RF communication channels to voice and data traffic and routes such traffic to and from an antenna 102 coupled to BTS 106.

Figure 3:
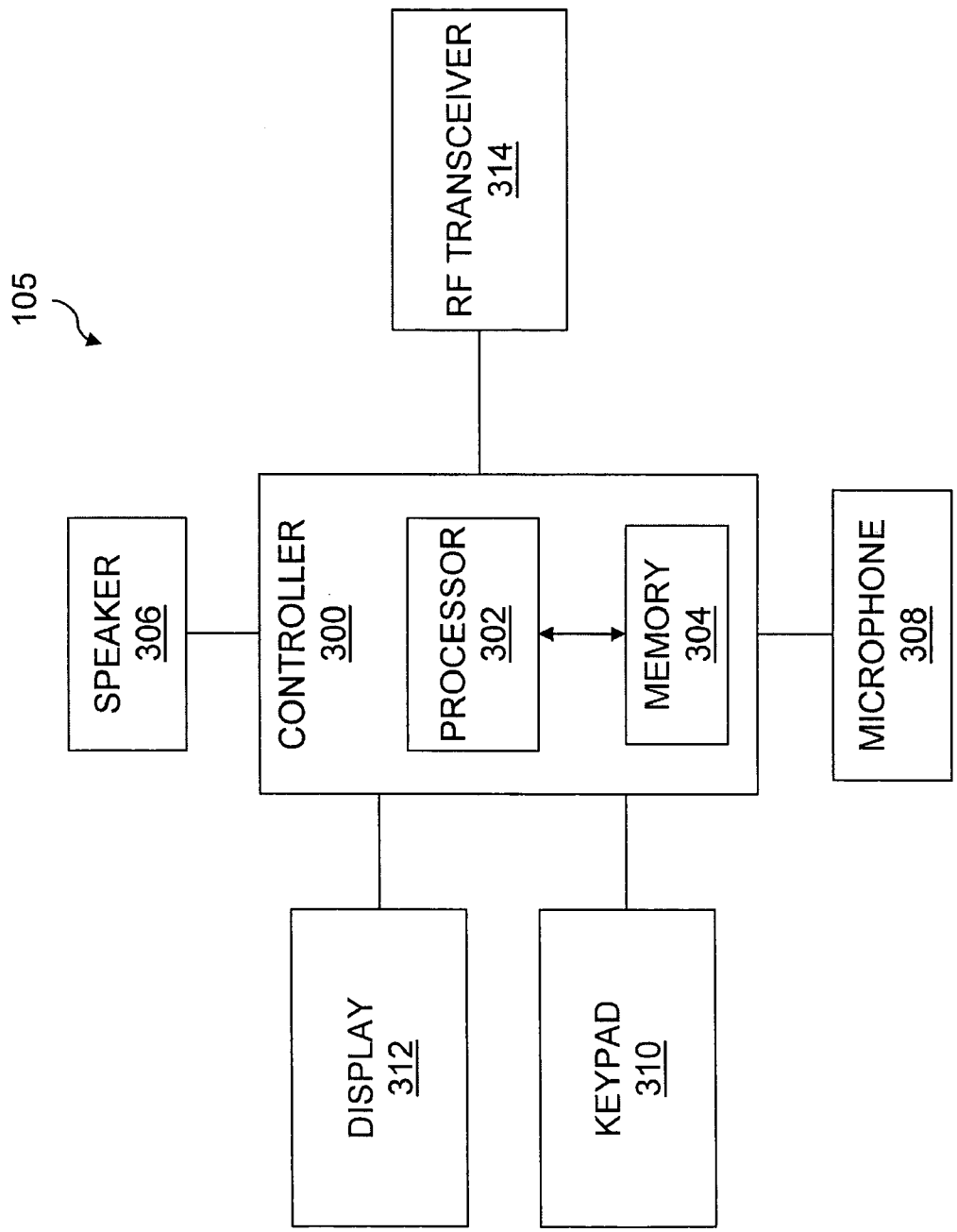
FIG. 3 is a more detailed block diagram of a mobile station within the communication network of FIG. 1 in accordance with the present invention.

With reference now to FIG. 3, there is illustrated a more detailed block diagram of an exemplary mobile station 105 within communication network 200 in accordance with the present invention. As shown, mobile station 105 includes a controller 300 that generally includes a processor 302 and a memory 304. Processor 302 executes a control program stored within memory 304 to implement the subscriber unit side of the multiple-access protocol employed by communication network 100. Mobile station 105 further includes a speaker (ear piece) 306 by which controller 300 presents audio outputs to a subscriber and a microphone (mouth piece) 308 that receives audio inputs from the subscriber. Mobile station 105 also has a keypad 310 by which the subscriber can enter callee telephone numbers and other keyed inputs and a display 312 through which controller 300 can visually present alphanumeric and graphical outputs for viewing by the subscriber. Finally, mobile station 300 includes a radio frequency transceiver 314 for sending and receiving wireless signals, including the messaging described herein, over-the-air.

Although the invention may be implemented in communication networks supporting various protocols for RF communication, preferred embodiments of the invention will now be described in detail with reference to a CDMA network. In particular, three embodiments of the present invention are described below, each of which supports the communication of additional concurrent services information to reduce the ambiguity in concurrent services capability present in conventional cdma2000-compliant network implementations.

According to the first embodiment, both a base station (BS) and MS indicate their true concurrent service capability so that each is aware of the concurrent services capability of the other. In one implementation of the first embodiment, the meaning of the CS_SUPPORTED field referred to above, which may be included in a variety of messages originating from the BS and MS, is modified to indicate the simultaneous support capability of non-packet (e.g. voice, asynchronous, or facsimile) and packet data services, rather than simply simultaneous support of multiple service instances. Thus, a CS_SUPPORTED field set to '1' indicates the BS or MS supports concurrent voice and data sessions, and otherwise indicates the BS or MS does not support concurrent voice and data sessions.

In addition to the CS_SUPPORTED field, the first embodiment of the present invention introduces a new field NUM_SIM_DATA_SUP, which indicates the number of simultaneous packet data services supported by a BS or MS. When set to '0', NUM_SIM_DATA_SUP indicates that no simultaneous packet data services are supported. If, on the other hand, this field has a non-zero value, it indicates that the BS or MS can support up to the number of simultaneous packet data services indicated by the field. The MS is programmed to not request more than maximum number of concurrent services that both the BS and MS can support.

Table I, below, summarizes the meanings of the possible combinations of the CS_SUPPORTED and NUM_SIM_DATA_SUP fields in the first embodiment, assuming a maximum of 6 concurrent data services:

TABLE 1

| Concurrent Service Supported (CS_SUPPORTED) (1 bit) | Maximum Number of Simultaneous Packet Data Services Supported (NUM_SIM_DATA_SUP) (3 bits) | Meaning |
| --- | --- | --- |
| 0 | 0 | No concurrent service supported |
| 0 | >1 (e.g., 2, 3, up to 6) | Support simultaneous packet data services, but does not support concurrent voice (or other non-packet services) and packet data services |
| 1 | 0 | Invalid combination |
| 1 | >0 (up to 6) | Support concurrent of one voice and one or multiple |

As can be seen from Table I, both a BS and a MS are informed of the precise concurrent service capability of the other and can accordingly operate without unnecessary messaging. For example, assuming a BS has CS_SUPPORTED set to 0 and NUM_DATA_CS_SUP set to 3, a MS "knows" that the BS does not support concurrent voice and data services; "knows" that the BS supports up to 3 simultaneous data services; cannot request connection of a fourth data service if the MS already has three active data services connected; and appropriately handles a user request to make a voice call by either dropping all data services (to dormant state) and connecting the voice call or by delaying the voice call request until the conclusion of the data services.

Figure 4:
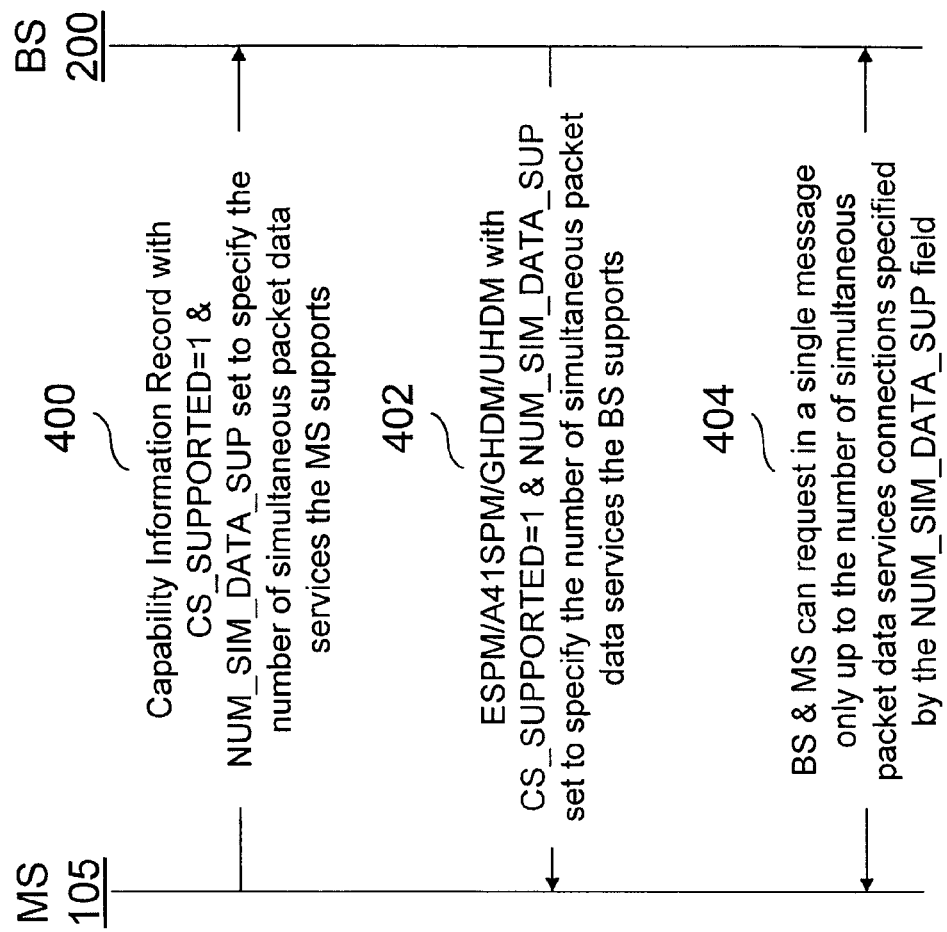
FIG. 4 is an exemplary message flow in which precise concurrent services capability information is communicated between a base station and mobile station in accordance with a first embodiment of the present invention.

The CS_SUPPORTED and NUM_SIM_DATA_SUP fields employed in the first embodiment of the present invention may be communicated between the BS and MS in any of a variety of messages. For example, as shown in FIG. 4, a MS 105 (e.g., under the control of software or firmware) may transmit CS_SUPPORTED and NUM_SIM_DATA_SUP fields to a BS 200 within a Capability Information record 400 included in an Origination, Enhanced Origination, or Reconnect Message or within a Status Response Message or an Extended Status Response Message, as described in Section 2.7.4.25 of the Standard. Based upon the operation of a software or firmware control program within data storage 204 executed by processor 202, BS 200 may then respond with an indication of its own concurrent services capabilities. In particular, BS 200 may communicate CS_SUPPORTED and NUM_SIM_DATA_SUP fields 402 within an Extended System Parameters Message (ESPM) (described in Section 2.6.2.2.5 of the Standard), an ANSI-41 System Parameters Message (described in Section 2.6.2.2.13 of the Standard), or a General HandoffDirection or Universal HandoffDirection Message (described in Section 2.6.6.2.5 of the Standard). Thereafter, as indicated by reference numeral 404, BS 200 and MS 105 can request within a single message only up the maximum number of simultaneous packet data services specified by the other.

It should be noted that in the Traffic Channel Initialization Substate described in Section 2.6.4.2 of the Standard, in which the MS verifies that it can receive the Forward Traffic Channel and begins transmitting on the Reverse Traffic Channel, the MS sets the CS_SUPPORTED and NUM_SIM_DATA_SUP fields in accordance with the P_REV_IN_USE field. That is, if P_REV_IN_USE is less than seven, the mobile station sets CS_SUPPORTED to '0' and NUM_SIM_DATA_SUP to '000'.

Turning now to the second embodiment of the present invention, the concurrent services capabilities of the MS and BS are communicated between the MS and BS utilizing the conventional CS_SUPPORTED field, as well as two newly introduced fields, NUM_PKT_SERV_SUP and NUM_NON_PKT_SERV_SUP. These new fields respectively indicate the maximum number of packet data service instances the network entity (MS or BS) supports and the maximum number of non-packet data service instances the network entity (MS or BS) supports. Both BS and MS set the maximum number of supported simultaneous packet and non-packet services independently, and are restricted to requesting only up to the maximum number of supported packet and non-packet service instances indicated by other. Of course, the total number of requested non-packet and packet service instances cannot exceed the maximum number of service instances supported by the traffic channel (i.e., in the Standard, the maximum concurrent services can be supported is 6). If either the BS or MS does not support concurrent service capability (i.e., the CS_SUPPORTED field is set to '0'), both of these new fields will be set to zero.

Figure 5:
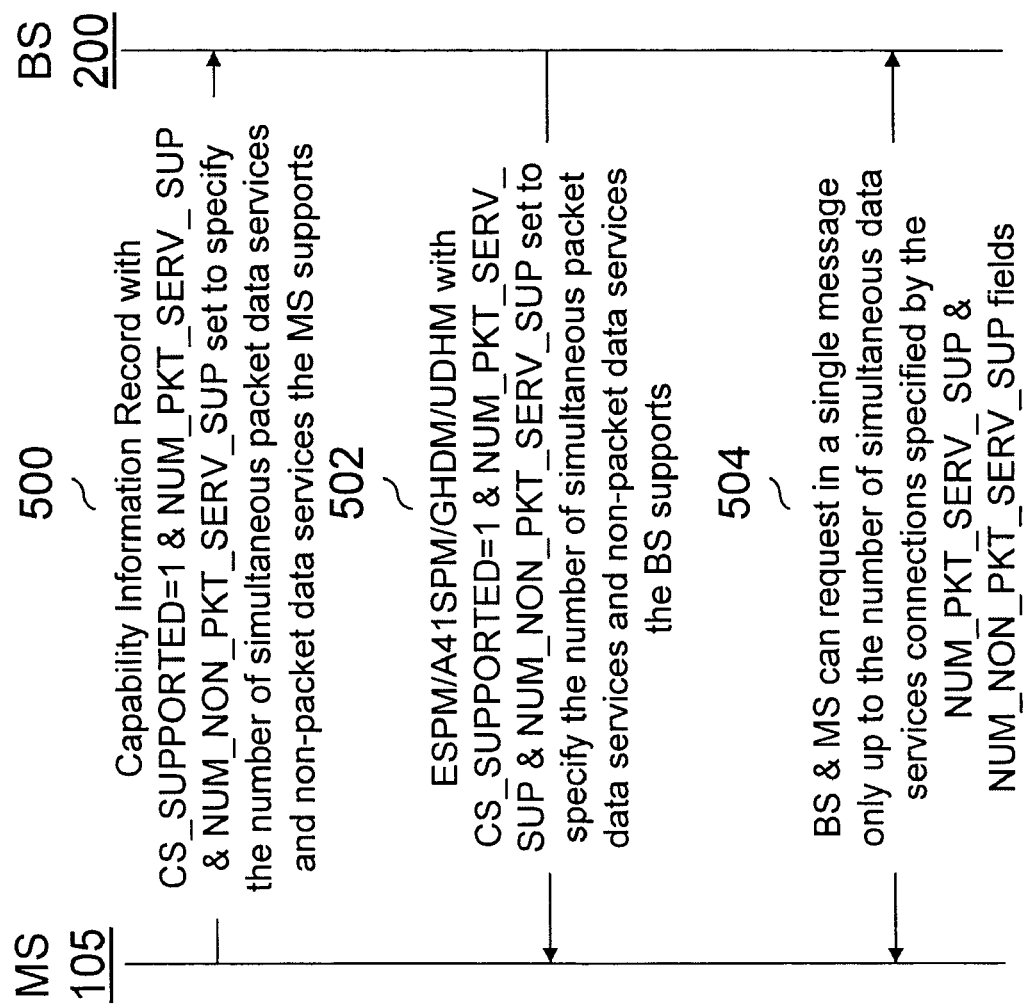
FIG. 5 is an exemplary message flow in which precise concurrent services capability is communicated between a base station and mobile station in accordance with a second embodiment of the present invention.

Referring now to FIG. 5, there is depicted an exemplary message flow in which precise concurrent services capability is communicated between a BS and MS in accordance with a second embodiment of the present invention. As shown, the depicted segment of a call begins with MS 105 (operating under the control of software or firmware) transmitting to BS 200 a Capability Information Record 500 containing CS_SUPPORTED, NUM_PKT_SERV_SUP and NUM_NON_PKT_SERV_SUP fields respectively indicating whether MS 105 supports concurrent services, the number of concurrent packet data services MS 105 supports, and the number of concurrent non-packet data services MS 105 supports.

As depicted at reference numeral 502, BS 200 (again operating under the control of software or firmware) similarly precisely indicates to MS 105 within an ESPM, A41SPM, GHDM or UDHM its own concurrent services capability by including appropriate settings of CS_SUPPORTED, NUM_PKT_SERV_SUP and NUM_NON_PKT_SERV_SUP. Thereafter, BS 200 and MS 105 can request in a single message only up to the minimum of (MS_NUM_NON_PKT_SERV_SUP, BS_NUM_NON_PKT_SERV_SUP) non-packet related packet data services and up to the minimum of (MS_NUM_PKT_SERV_SUP, BS_NUM_PKT_SERV_SUP) packet data services. Of course, the total number of service instances requested, for example, in an Origination Message or Reconnect Message is preferably limited to the maximum number of supported services, which in the case of the Standard is 6.

With reference now to FIGS. 6A and 6B, a third embodiment of the present invention is now described. According to the third embodiment, the conventional CS_SUPPORTED field is utilized to generally indicate concurrent services capability as defined in the Standard. The BS (but not the MS) provides additional information regarding the maximum number of concurrent service instances it can support utilizing a new field, MAX_ADD_SERV_INSTANCE. In one implementation, MAX_ADD_SERV_INSTANCE has a value between 1 and 7.

As shown in FIG. 6A at reference numeral 600, BS 200 may transmit the MAX_ADD_SERV_INSTANCE field to MS 105 in an Extended Service Parameter Message (ESPM)

or A41SPM. Alternatively, as shown in FIG. 6B at reference numeral 604, the MAX_ADD_SERV_INSTANCE field may be transmitted from BS 200 to MS 105 in a UHDM or In-Traffic System Parameters Message (ITSPM) (described in Section 3.7.3.3.2.7 of the Standard).

If the message received by MS 105 indicates that concurrent services are supported (i.e., CS_SUPPORTED is not equal to '0'), MS 105 may subsequently request in a particular message no more than the number of additional service instances specified by the MAX_ADD_SERV_INSTANCE field. That is, when MS 105 originates a subsequent call with Origination Message (ORM) 602 of FIG. 6A or Extended Origination Message 606 of FIG. 6B, MS 105 cannot request more concurrent services instances than BS 200 previously indicated that BS 200 can support.

As will be appreciated upon comparison of the third embodiment with the first and second embodiments, the third embodiment is advantageous in that it entails the addition or modification of fewer fields, while still providing enhanced precision in the communication of concurrent services capabilities as compared with the Standard. However, the third embodiment does not distinguish between the number of supported non-packet and packet data services instances.

As has been described, the present invention provides improved methods, systems and program products for improved communication and utilization of concurrent services capabilities in a wireless communication network. As indicated by the multiple embodiments of the invention herein disclosed, indications of the concurrent services capabilities of a BS and MS may be expressed within a variety of messages and utilizing a wide variety of conventional and/or newly introduced message fields. Regardless of the form in which communicated or stored, the indications of the concurrent services capabilities permit improved control of and signaling by mobile stations and base stations within a communication network.

While the invention has been particularly shown as described with reference to a preferred embodiment, it will be understood by those skilled in the art that various changes in form and detail may be made therein without departing from the spirit and scope of the invention. For example, although the present invention has been described with respect to a particular Standard and specified field names, it will be appreciated that the present invention is also applicable to wireless communication employing other standards and utilizing different fields and/or message to carry concurrent services capability indications.

In addition, although aspects of the present invention have been described with respect to systems (e.g., mobile stations and base stations) executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of communication in a communication network including first and second network entities, said method comprising:

receiving at the second network entity at least one message communicated over-the-air by the first network entity, said at least one message including a first field and a second field, wherein the first field is set to a value indicating support by the first network entity for concurrent over-the-air voice and packet data service instances with the second network entity, and the second field is set to indicate a number of the concurrent over-the-air voice and packet data service instances supported by the first network entity, and wherein each packet data service instance includes a session to communicate packet data, and wherein each voice service instance includes a session to communicate voice; and said second network entity limiting a number of concurrent over-the-air voice and packet data service instances requested by the second network entity in accordance with the second field in said at least one message.

2. The method of claim 1, wherein:
said second network entity comprises a mobile station; and
said limiting comprises limiting a number of concurrent over-the-air voice and packet data service instances requested by the mobile station in accordance with the second field.

3. The method of claim 1, wherein:
said second network entity comprises a base station; and
said limiting comprises limiting a number of concurrent over-the-air voice and packet data service instances requested by the base station in accordance with the second field.

4. The method of claim 1, further comprising receiving at the second network entity a second message including first and second fields, the first field in the second message set to a second value indicating support by the first network entity for concurrent over-the-air packet data service instances, and the second field in the second message specifically indicating a number of concurrent over-the-air packet data service instances supported by the first network entity.

5. The method of claim 4, further comprising receiving at the second network entity a third message including first and second fields, the first field in the third message set to a third value indicating support by the first network entity for concurrent over-the-air non-packet data service instances, and the second field in the third message specifically indicating a number of concurrent over-the-air non-packet data service instances supported by the first network entity.

6. The method of claim 1, wherein said receiving comprises said second network entity receiving said at least one message in accordance with a Code Division Multiple Access (CDMA) communication protocol.

7. The method of claim 1, wherein:
said at least one message comprises at least one first message; and
said method further comprises said second network entity transmitting to said first network entity at least one second message over-the-air, said at least one second message including one or more message fields indicating a number of concurrent over-the-air voice and packet data service instances with the first network entity supported by the second network entity.

8. A first network entity in a wireless communication network, said first network entity comprising:
a transceiver to perform over-the-air communication; and
a processor to communicate messages over-the-air with an other network entity within the wireless communication network, said processor to receive at least one message communicated over-the-air by the other network entity, said at least one message including first and second fields, the first field having a value indicating support by the other network entity for concurrent over-the-air voice and packet data service instances with the first network entity, and the second field indicates a number of the concurrent over-the-air voice and packet data service instances supported by the other network entity, and wherein each packet data service instance includes a session to communicate packet data, and wherein each voice service instance includes a session to communicate voice; and said processor to limit a number of concurrent over-the-air voice and packet data service instances requested by the first network entity in accordance with the second field in said at least one message.

9. The first network entity of claim 8, wherein the first network entity comprises a mobile station.

10. The first network entity of claim 8, wherein the first network entity comprises a base station.

11. The first network entity of claim 8, wherein said processor is to receive a second message having first and second fields, the first field in the second message having a second value indicating support by the other network entity for concurrent over-the-air packet data service instances, and the second field in the second message specifically indicating a number of the concurrent over-the-air packet data service instances supported by the other network entity.

12. The first network entity of claim 11, wherein said processor is to receive a third message having first and second fields, the first field in the third message having a third value indicating support by the other network entity for concurrent over-the-air non-packet service instances, and the second field specifically indicating a number of the concurrent over-the-air non-packet data service instances supported by the other network entity.

13. The first network entity of claim 8, wherein said at least one message is in accordance with a Code Division Multiple Access (CDMA) communication protocol.

14. The first network entity of claim 8, wherein:
said at least one message comprises at least one first message; and
said processor to further transmit to said other network entity at least one second message over-the-air, said at least one second message including one or more message fields indicating a number of concurrent over-the-air voice and packet data service instances with the other network entity supported by the first network entity.

15. A program product for operating a network entity in a wireless communication network, said program product comprising a non-transitory data storage medium containing program code that when executed by a first network entity causes the first network entity to:

receive at least one message communicated over-the-air by a second network entity, said at least one message including first and second fields, wherein the first field is set to a value indicating support by the second network entity for concurrent over-the-air voice and packet data service instances with the first network entity, and the second field is set to indicate a number of the concurrent over-the-air voice and packet data service instances supported by the second network entity, and wherein each packet data service instance includes a session to communicate packet data, and wherein each voice service instance includes a session to communicate voice; and limit a number of concurrent over-the-air voice and packet data service instances requested by the first network entity in accordance with the second field in said at least one message.

16. The program product of claim 15, wherein the first network entity comprises a mobile station.

17. The program product of claim 15, wherein the first network entity comprises a base station.

18. The program product of claim 15, wherein the program code when executed causes the first network entity to further receive a second message including first and second fields, the first field in the second message set to a second value indicating support by the second network entity for concurrent over-the-air packet data service instances, and the second field in the second message specifically indicating a number of the concurrent over-the-air packet data service instances supported by the second network entity.

19. The program product of claim 18, wherein the program code when executed causes the first network entity to further receive a third message including first and second fields, the first field in the third message set to a third value indicating support by the second network entity for concurrent over-the-air non-packet data service instances, and the second field in the third message specifically indicating a number of the concurrent over-the-air non-packet data service instances supported by the second network entity.

20. The program product of claim 15, wherein the at least one message is in accordance with a Code Division Multiple Access (CDMA) communication protocol.

21. The program product of claim 15, wherein:
said at least one message comprises at least one first message; and
wherein the program code when executed causes the first network entity to further transmit to said second network entity at least one second message over-the-air, said at least one second message including one or more message fields indicating a number of concurrent over-the-air voice and packet data service instances with the second network entity supported by the first network entity.

* * * * *